| (12) | United States Patent | (10) Patent No.: | US 9,578,225 B2 |
|---|---|---|---|
| | Oyama | (45) Date of Patent: | Feb. 21, 2017 |

(54) IMAGE PICKUP APPARATUS AND CONTROL METHOD OF IMAGE PICKUP APPARATUS ARRANGED TO DETECT AN ATTITUDE

(71) Applicant: CANON KABUSHIKI KAISHA, Tokyo (JP)

(72) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 14/132,432

(22) Filed: Dec. 18, 2013

(65) Prior Publication Data

US 2014/0176746 A1    Jun. 26, 2014

(30) Foreign Application Priority Data

Dec. 21, 2012    (JP) .................................. 2012-279599

(51) Int. Cl.
  *H04N 5/232*    (2006.01)
  *H04N 1/32*    (2006.01)

(52) U.S. Cl.
  CPC .......... *H04N 5/232* (2013.01); *H04N 1/32128* (2013.01); *H04N 2201/3254* (2013.01)

(58) Field of Classification Search
  CPC ................ H04N 5/232; H04N 1/32128; H04N 2201/3254
  See application file for complete search history.

(56) References Cited

U.S. PATENT DOCUMENTS

| 5,920,688 A * | 7/1999 | Cooper et al. ................ 345/650 |
| 6,563,535 B1 * | 5/2003 | Anderson ............ H04N 1/0044 348/231.2 |
| 2003/0052985 A1 * | 3/2003 | Oya et al. ................ 348/333.02 |
| 2004/0023685 A1 * | 2/2004 | Nakamura .......... H04M 1/0214 455/550.1 |
| 2007/0182839 A1 * | 8/2007 | Ogino ...................... 348/333.01 |
| 2007/0183762 A1 * | 8/2007 | Washisu .......................... 396/53 |
| 2010/0225771 A1 * | 9/2010 | Yumiki ...................... 348/207.2 |
| 2011/0128410 A1 * | 6/2011 | Lee ........................ H04N 5/772 348/231.99 |
| 2011/0221914 A1 * | 9/2011 | Shinbo et al. ............. 348/208.2 |

(Continued)

FOREIGN PATENT DOCUMENTS

| CN | 102819163 A | 12/2012 |
| JP | 58-182977 A | 10/1983 |

(Continued)

OTHER PUBLICATIONS

The above foreign patent documents were cited in the Jan. 5, 2016 Japanese Office Action, which is enclosed without an English Translation, that issued in Japanese Patent Application No. 2012279599.

(Continued)

*Primary Examiner* — Albert Cutler

(74) *Attorney, Agent, or Firm* — Cowan, Liebowitz & Latman, P.C.

(57) ABSTRACT

When an image is photographed vertically, vertical position information is added to the image. When an upside-down image is photographed, data itself is rotated by 180 degrees and recorded. Thus, when the image is reproduced by a general another reproducing apparatus, the image can be viewed with the too and bottom thereof being normally positioned.

31 Claims, 4 Drawing Sheets

(56) References Cited

U.S. PATENT DOCUMENTS

| | | | |
|---|---|---|---|
| 2011/0279654 A1* | 11/2011 | Ueda | G03B 17/14 |
| | | | 348/49 |
| 2011/0298940 A1* | 12/2011 | Cheong | H04M 1/72522 |
| | | | 348/222.1 |
| 2012/0140092 A1* | 6/2012 | Nourbakhsh | H04N 5/2628 |
| | | | 348/231.99 |
| 2013/0120606 A1* | 5/2013 | Iwasaki | H04N 5/232 |
| | | | 348/222.1 |
| 2014/0132708 A1* | 5/2014 | Kato | H04N 5/23238 |
| | | | 348/36 |

FOREIGN PATENT DOCUMENTS

| | | |
|---|---|---|
| JP | 07-143434 A | 6/1995 |
| JP | 2003-274366 A | 9/2003 |
| JP | 2004-208096 A | 7/2004 |

OTHER PUBLICATIONS

The above references were cited in a Sep. 6, 2016 Chinese Office Action, which is enclosed with an English Translation, that issued in Chinese Patent Application No. 2013107144714.

* cited by examiner

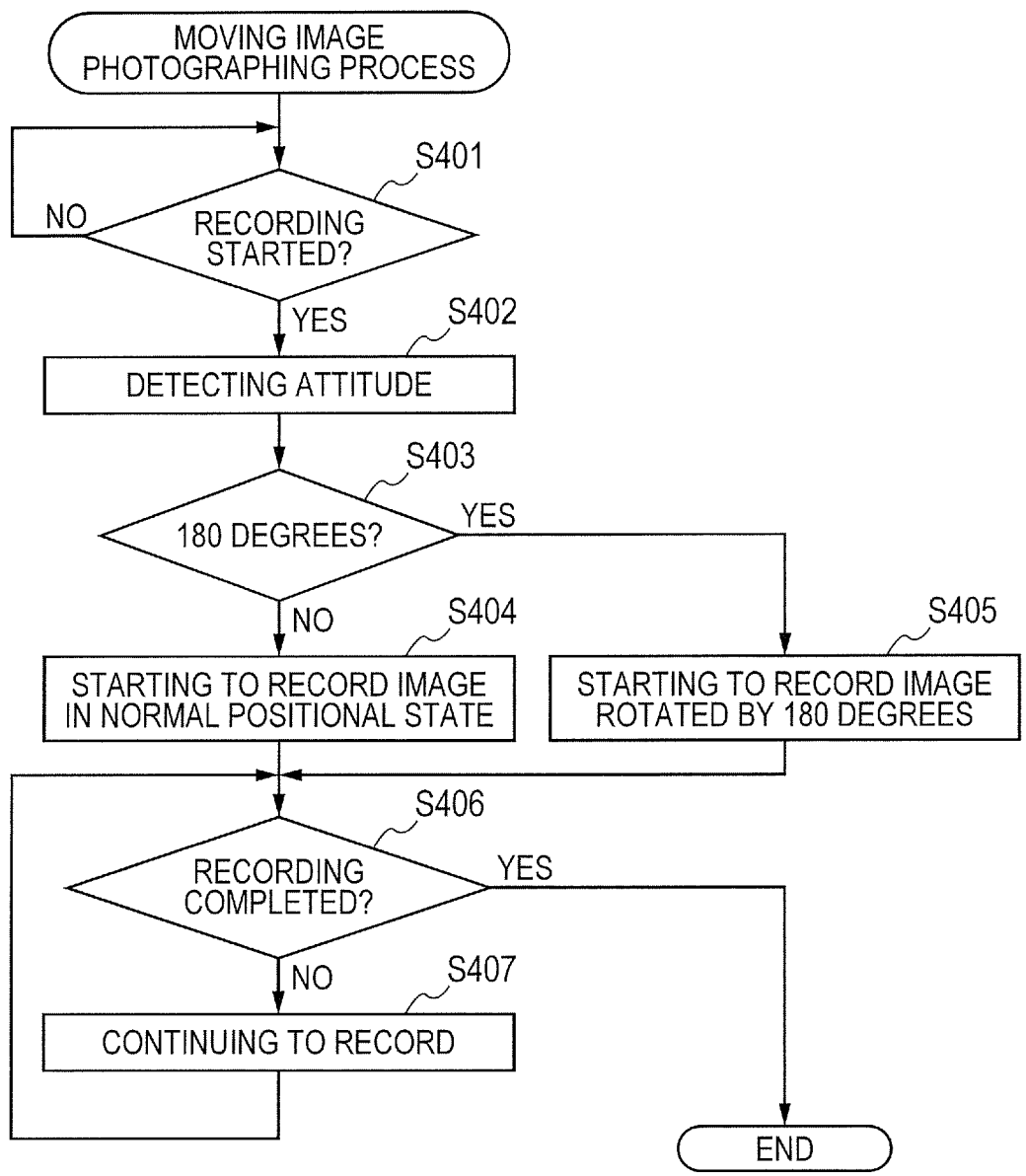

IMAGE PICKUP APPARATUS AND CONTROL METHOD OF IMAGE PICKUP APPARATUS ARRANGED TO DETECT AN ATTITUDE

BACKGROUND OF THE INVENTION

Field of the Invention

The present invention relates to an image pickup apparatus and a control method of the image pickup apparatus and, more particularly, to a recording and reproducing technique of a photographed image, suitable for use in an image pickup apparatus arranged to detect an attitude.

Description of the Related Art

When an image pickup apparatus is used to photograph an image, there may be a case where the image pickup apparatus is held vertically as well as a case where being held in a conventionally normal positional state. In this instance, there has been known a method whereby angle information showing a photographing angle is added to image information showing a photographed image, the image is rotated and displayed on an image reproducing apparatus side on the basis of the angle information, and a browsing person views the image with the top and bottom thereof being normally positioned.

Japanese Patent Application Laid-Open No. S58-182977 proposes an image information reproducing apparatus constructed in such that in the case where an image is photographed vertically, an attitude flag showing that the image is photographed vertically is added, and at the time of reproduction, the image is rotated vertically and displayed.

Japanese Patent Application Laid-Open No. 2004-208096 proposes such a digital camera that when an image is photographed vertically, a frame for a framing assistance is displayed, and in the case where the image is photographed in such a state, the photographed image is recorded in a state where it is rotated by 90 or 270 degrees.

Such image pickup apparatuses that a display apparatus portion is closable or rotatable to a main body of the image pickup apparatus has also been known. Those image pickup apparatuses can in an arbitrary angular state to photograph. There is also a product which presumes a usage case where the image pickup apparatus is held upside down.

If a vertical image photographed by holding the image pickup apparatus vertically is displayed by adjusting the top and bottom of the image to those of a display apparatus and further fitting the image into a general landscape display area, the image is reduced more than that in the case where the image is displayed so as to fit into a vertically long display area. Therefore, in a display apparatus which can be held in a hand of the user of a portable phone terminal, a digital camera, or the like, in order to largely display a vertical image with a full screen, there is a case where the function for performing the rotational display according to the attitude flag as disclosed in Japanese Patent Application Laid-Open No. S58-182977 is used purposely in an off state. In such a case, the vertical image having a flag of 90 degrees is displayed so that the top and bottom thereof are positioned in the lateral direction of the display apparatus.

However, changing a holding state of the display apparatus so as to rotate the display apparatus itself by 90 degrees, the used can change the top and bottom of the image so as to be positioned in the normal direction when seen from the user and can see the largely displayed image. It is assumed here that the rotation of the image according to the attitude of the display apparatus is not performed. The reason why the function for performing the rotational display according to the attitude flag is purposely turned off is that there is such an advantage that the user can see the largely displayed image as mentioned above.

However, in the case where an image held upside down by 180 degrees is displayed, the user needs to rotate the display apparatus itself by 180 degrees in order to see the image with the top and bottom thereof being positioned in the normal direction. However, even if the display apparatus itself is rotated by 180 degrees, since a size of the image after the rotation of the display apparatus is equal to that of the image before the display apparatus is rotated, the advantage which is caused by turning off the rotational display according to the flag is not obtained for the user. That is, since the user has to rotate the display apparatus, it simply results in a surplus troublesomeness.

According to the method whereby before the image is recorded, the image itself is rotated in the direction according to the attitude of the image pickup apparatus and the recording is performed as disclosed in Patent Literature 2 of Japanese Patent Application Laid-Open No. 2004-208096, there is such a problem that the vertical image is displayed rather small in the landscape display area.

The foregoing problem also occurs similarly in a display apparatus which does not inherently have the function for performing the rotational di-play according to the attitude flag.

SUMMARY OF THE INVENTION

The invention is made in consideration of the foregoing problems and it is an aspect of the invention to enable an image photographed by vertically holding an image pickup apparatus to be largely displayed onto a display apparatus. It is another aspect of the invention to provide an image pickup apparatus which performs such a recording that an image photographed by holding the image pickup apparatus upside own can be displayed by a display apparatus so that the top and bottom of the image are displayed in the normal direction.

According to an aspect of the invention, an image pickup apparatus comprises: an image pickup unit; an attitude detection unit configured to detect an attitude of the image pickup unit; and a control unit configured to control on the basis of the attitude detected by the attitude detection unit when the photographing by the image pickup unit is performed, in such a manner that in a case where the image pickup unit is held vertically and the image is photographed, the photographed image is recorded into a recording medium without being rotated, and attitude information showing that the image pickup unit is held vertically is recorded as attribution information into the recording medium in association with the image, and in a case whereat image is photographed by holding the image pickup unit upside down, the photographed image is rotated upside down and recorded into the recording medium, and attitude information showing that the image pickup unit is held upside down is not added.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a flowchart for describing the moving image generating operation to a direction of the image pickup apparatus in a moving image photographing according to the embodiment of the invention.

DESCRIPTION OF THE EMBODIMENTS

Various exemplary embodiments, features, and aspects of the present invention will be described in detail below with reference to the drawings.

Figure 1:
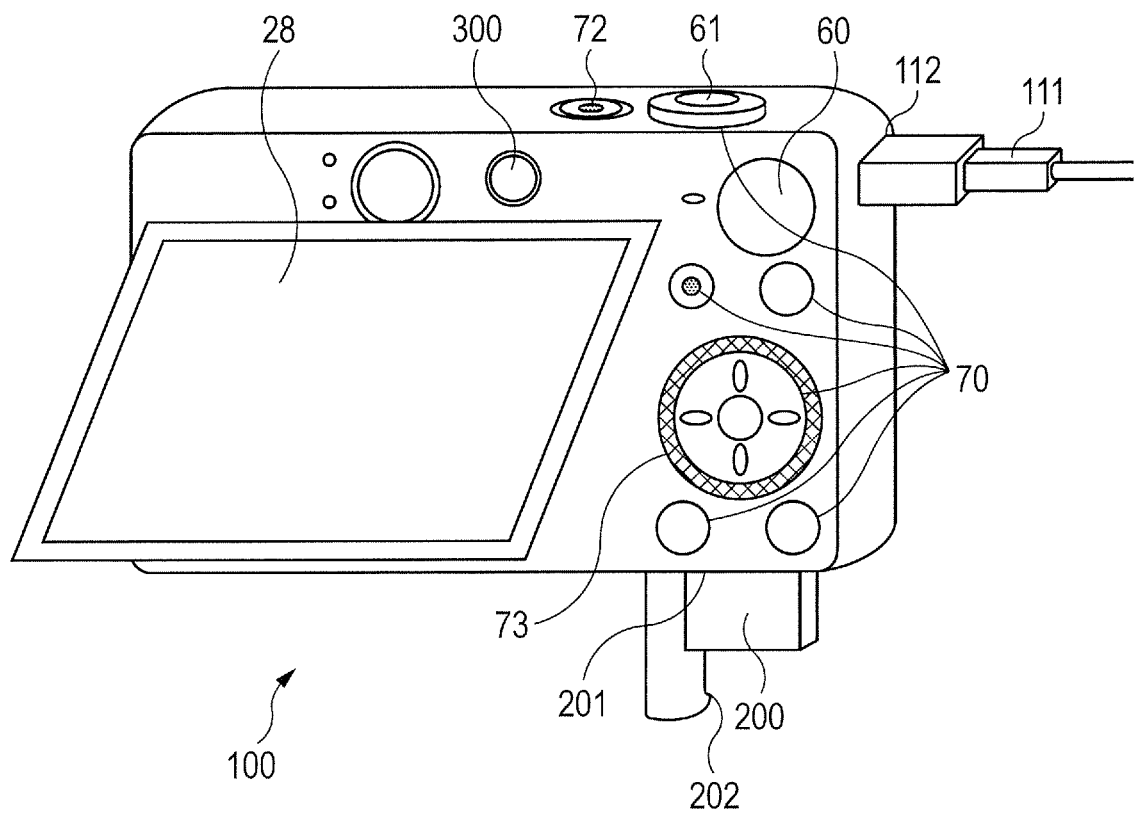
FIG. 1 is a diagram illustrating an example of a rear view of an external appearance of an image pickup apparatus of an embodiment.

In the present embodiment, FIG. 1 illustrates an external view of a digital camera as an example of an image pickup apparatus having an image pickup unit for photographing an object image and obtaining a photographed image.

In a digital camera 100 of the embodiment, a display unit 28 displays an image and various kinds of information. A backlight is mounted to the display unit 28 so that displayed contents are visible even in a dark place.

The display unit 28 is mounted through a close and open mechanism to an apparatus main body of the digital camera 100. The display unit 28 has the following variable angle mechanism for enabling an angle of the display unit 28 to be adjusted. That is, when a low-angle shot is performed by the image pickup apparatus being held at a lower position, while the image pickup apparatus itself is directed upward, the display unit 28 can be adjusted to the angle at which the photographer can easily see. On the contrary, when a high-angle shot is performed by the image pickup apparatus being held at a higher position, and by holding the image pickup apparatus upside down, the display unit 28 can be adjusted to the angle at which the photographer can easily see while the image pickup apparatus itself is directed downward.

A shutter button 61 is an operation unit to instruct the photographing and can be depressed at two stages including a half-depression state. A mode switching button 60 is an operation unit to change over various kinds connecting cable and the digital camera 100.

An operation unit 70 is constructed by operation members such as various kinds of switches for receiving various kinds of operations from the user, button, touch panel, and the like. A controller wheel 73 is a rotatable operation member included in the operation unit 70. An electric power switch 72 is provided to change over a power-on and a power-off.

An In-camera 300 is used to photograph an appreciating person or photographer. A recording medium 200 is a memory card, a hard disk, or the like. A recording medium slot 201 is provided to insert the recording medium 200. The recording medium 200 inserted in the recording medium slot 201 can communicate with the digital camera 100. A cover 202 is provided to cover the recording medium slot 201.

Figure 2:
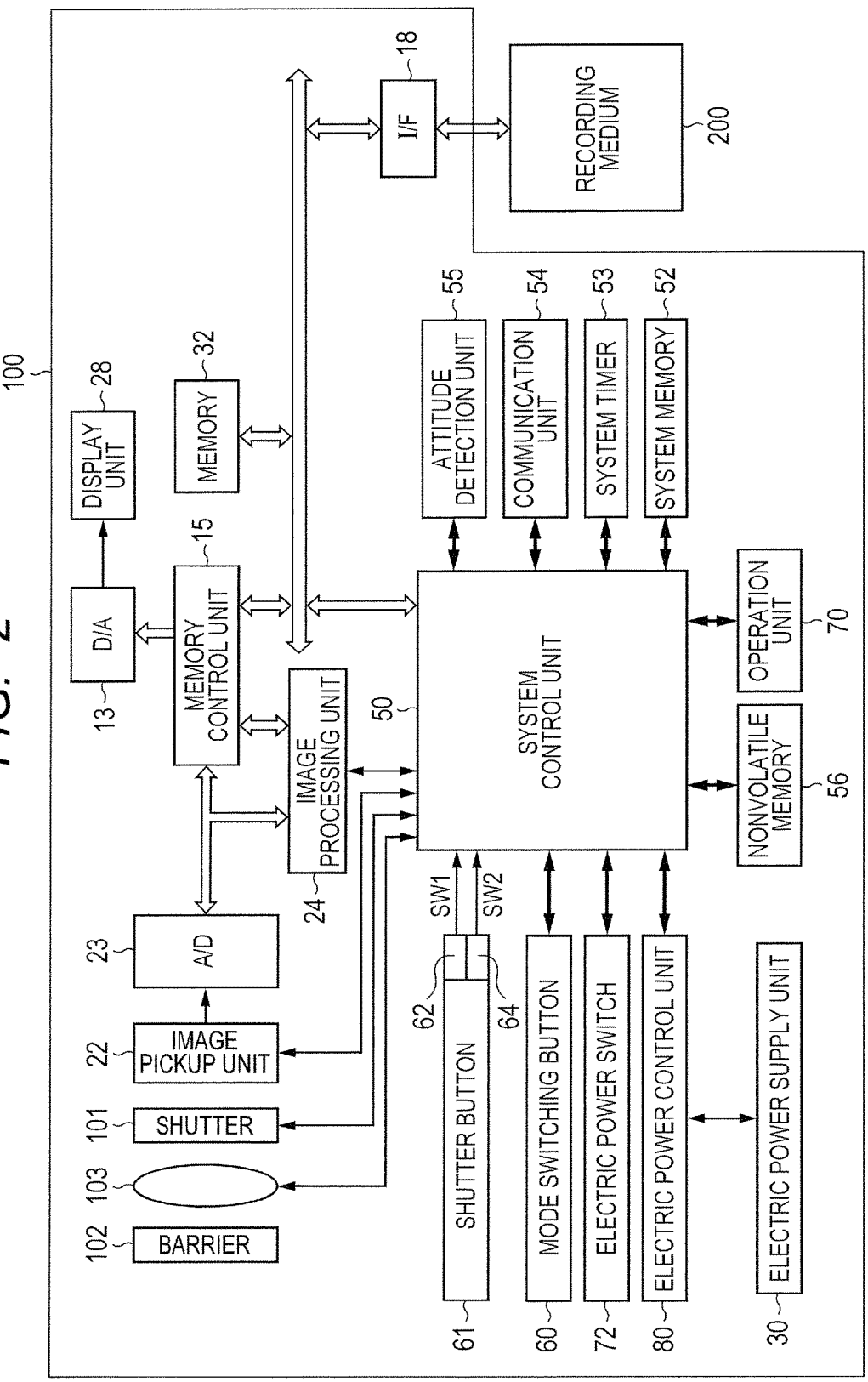
FIG. 2 is a block diagram illustrating an example of a hardware construction of the image pickup apparatus of the embodiment.

FIG. 2 is a block diagram illustrating an example of a construction of the digital camera 100 according to the embodiment.

In FIG. 2, a photographing lens 103 is a lens group including a zoom lens and a focus lens. A shutter 101 has an iris function. An image pickup unit 22 is an image pickup element constructed by a COD, a CMOS element, or the like for converting an optical image into an electric signal.

An A/D converter 23 converts an analog signal into a digital signal. The A/D converter 23 is used to convert an analog signal which is output from the image pickup unit 22 into a digital signal. A barrier 102 covers an image pickup system including the photographing lens 103 of the digital camera 100, thereby preventing a dirt or damage of the image pickup system including the photographing lens 103, shutter 101, and image pickup unit 22.

An image processing unit 24 executes a resizing process such as predetermined pixel interpolation or reduction and a color converting process to data from a memory control unit 15. In the image processing unit 24, a predetermined arithmetic operating process is executed by using the data of the photographed image. A system control unit 50 performs exposure control and distance measurement control on the basis of an obtained arithmetic operation result. Thus, an AF (Auto-Focus) process of a TTL (Through-The-Lens) method, an AB (Auto-Exposure) process, and an BE (flash light pre-emitting) process are executed. In the image processing unit 24, further, a predetermined arithmetic operating process is executed by using the data of the photographed image and an AWB (Auto-White Balance) process of the TTL method is also executed on the basis of the obtained arithmetic operation result.

The output data from the A/D converter 23 is written into a memory 32 through the image processing unit 24 and the memory control unit 15 or is directly written into the memory 32 through the memory control unit 15. The memory 32 also stores the image data which is obtained by the image pickup unit 22 and is converted into the digital data by the A/D converter 23 or the image data to be displayed to the display unit 28. The memory 32 has a storage capacity enough to store a predetermined number of still images and moving images and audio sound of a predetermined time.

The memory 32 also functions as a memory (video memory) for displaying the image. A D/A converter 13 converts the image displaying data stored in the memory 32 into an analog signal and supplies to the display unit 28. The image displaying data written in the memory 32 as mentioned above is displayed by the display unit 28 through the D/A converter 13.

The display unit 28 performs a display according to the analog signal from the D/A converter 13 onto a display device such as an LCD or the like. The digital signal which is once A/D converted by the A/D converter 23 and is stored in the memory 32 is converted into the analog signal by the D/A converter 13 and is successively transferred to the display unit 28 and the image is displayed, so that the display unit 28 functions as an electronic viewfinder and is constructed so that a through image can be displayed.

A nonvolatile memory 56 is an electrically erasable and recordable memory and, for example, an EEPROM or the like is used. Constants, a program, and the like for making the system control unit 50 operative are stored in the nonvolatile memory 56. The program mentioned here denotes a program for executing various kinds of flowcharts, which will be described hereinafter in the embodiment.

The system control unit 50 controls the whole digital camera 100. By executing the program recorded in the nonvolatile memory 56 mentioned above, each process of the embodiment, which will be described hereinafter, is realized. A RAM is used as a system memory 52. Constants and variables for making the system control unit 50 operative, the program read out of the nonvolatile memory 56, and the like are developed in the system memory 52. The system control unit 50 also makes display control by controlling the memory 32, D/A converter 13, display unit 28, and the like.

A system timer 53 is a time measuring unit for measuring a time which is used for various kinds of control and a time of a built-in timer.

The mode switching button 60, a first shutter switch 62, a second shutter switch 64, and the operation unit 70 are operation units for inputting various kinds of operation instructions to the system control unit 50.

The mode switching button 60 switches the operation mode of the system control unit 50 to any one of a still image recording mode, a moving image recording mode, a reproducing mode, and the like. As modes included in the still image recording mode, there are an auto-photographing mode, an auto-scene discriminating mode, a manual mode, various kinds of scene modes for providing photographing settings for every photographing scene, a program AE mode, a custom mode, and the like.

The operation mode is directly switched to any one of those modes included in the still image recording mode by the mode switching button 60. Or, after the operation mode is temporarily switched to the still image recording mode by the mode switching button 60, the operation mode may be switched to any one of those modes included in the still image recording mode by using another operation member. Similarly, a plurality of modes may be also included in the moving image recording mode.

The first shutter switch 62 is turned on during the operation of the shutter button 61 provided for the digital camera 100, that is, in what is called a half depression state (photographing preparation instruction) and generates a first shutter switch signal SW1. The operations such as AF (Auto-Focus) process, AE (Auto Exposure) process, AWB (Auto-White Balance) process, EF (flash light pre-emitting) process, and the like are started by the first shutter switch signal SW1.

The second shutter switch 64 is turned on by the completion of the operation of the shutter button 61, that is, in what is called a full depression (photographing instruction) and generates a second shutter switch signal SW2. By the second shutter switch signal SW2, the system control unit 50 starts the operations of a series of photographing processes from the read-out of the signal from the image pickup unit 22 to the writing of the image data into the recording medium 200.

By selectively operating various kinds of function icons displayed onto the display unit 28 or the like, the function is properly allocated for every scene to each operation member of the operation unit 70, so that the operation members function as various kinds of function buttons. As function buttons, for example, there are an "end" button, a "back" button, an "image feed" button, a "jump" button, a "limit" button, an "attribution change" button, and the like. For example, when a "menu" button is depressed, various kinds of settable menu screens are displayed onto the display unit 28. The user can intuitively make various kinds of settings by using the menu screens displayed on the display unit 28, upper, lower, right, and left 4-direction buttons, and a SET button.

The controller wheel 73 is a rotatable operation member included in the operation unit 70 and is used when a selection item is instructed or the like together with the direction buttons. By rotating the controller wheel 73, an electric pulse signal is generated in accordance with an operation amount. On the basis of such a pulse signal, the system control unit 50 controls each unit of the digital camera 100. An angle of the rotation, the number of times of the rotation, and the like of the controller wheel 73 can be discriminated by the pulse signal.

Any operation member which can detect the rotating operation can be used as a controller wheel 73. For example, such a dial operation member that the controller wheel 73 itself rotates in accordance with the rotating operation of the user and generates a pulse signal may be used. Such an operation member constructed by a touch sensor that detects the rotating operation of a finger of the user on the controller wheel 73 or the like the controller wheel 73 itself does not rotate may be used (what is called a touch wheel).

An electric power control unit 80 is constructed by a battery detection circuit, a DC-DC converter, a switch circuit for switching a block to be turned on, and the like and detects the presence or absence of a loading of a battery, a type of battery, and a battery residual capacity. On the basis of a result of the detection and an instruction of the system control unit 50, the electric power control unit 80 controls the DC-DC converter and supplies a necessary voltage to each unit including the recording medium 200 for a necessary period of time.

An electric power supply unit 30 is constructed by a primary battery such as alkaline battery, lithium battery, or the like, a secondary battery such as NiCd battery, NiMH battery, Li battery, or the like, an AC adaptor, and the like. A recording medium I/F 18 is an interface with the recording medium 200 such as memory card, hard disk, or the like. The recording medium 200 is recording medium such as a memory card or the like for recording the photographed image and is constructed by a semiconductor memory, a magnetic disk, or the like.

A communication unit 54 is connected in a wireless manner or by a wired cable and transmits and receives an image signal and an audio signal. The communication unit 54 can be also connected to a wireless LAN (Local Area Network) or Internet. The communication unit 54 can transmit the image (including a through image) picked up by the image pickup unit 22 or the image recorded in the recording medium 200 and can receive image data and other various kinds of information from external apparatuses.

An attitude detection unit 55 detects an attitude of the digital camera 100 with reference to the direction of gravity. On the basis of the attitude detected by the attitude detection unit 55, whether or not the image photographed by the image pickup unit 22 is an image photographed by laterally holding the digital camera 100 or an image photographed by vertically holding the digital camera 100 can be discriminated. The system control unit 50 can add information of orientation corresponding to the attitude detected by the attitude detection unit 55 to an image file of the image photographed by the image pickup unit 22 or rotate the image and record. An acceleration sensor, a gyro sensor, or the like can be used as an attitude detection unit 55.

The digital camera 100 can display a still image and a moving image recorded in the recording medium 200 onto the display unit 28. Whether or not a function for reflecting the attitude information to the image file and displaying the image is turned on or off can be set. When the function is ON, the attitude information added to the image file is read out and the image is rotated to the side opposite to the attitude information by an angle of the attitude information and displayed. For example, if the attitude flag of 90 degrees is added, the image is rotated by minus 90 degrees (by 270 degrees) and displayed. When the function is OFF, the attitude information added to the image file is not read out (or even if the attitude information is read out, it is not used) and the image recorded to the image file is displayed without being rotated.

Figure 3:
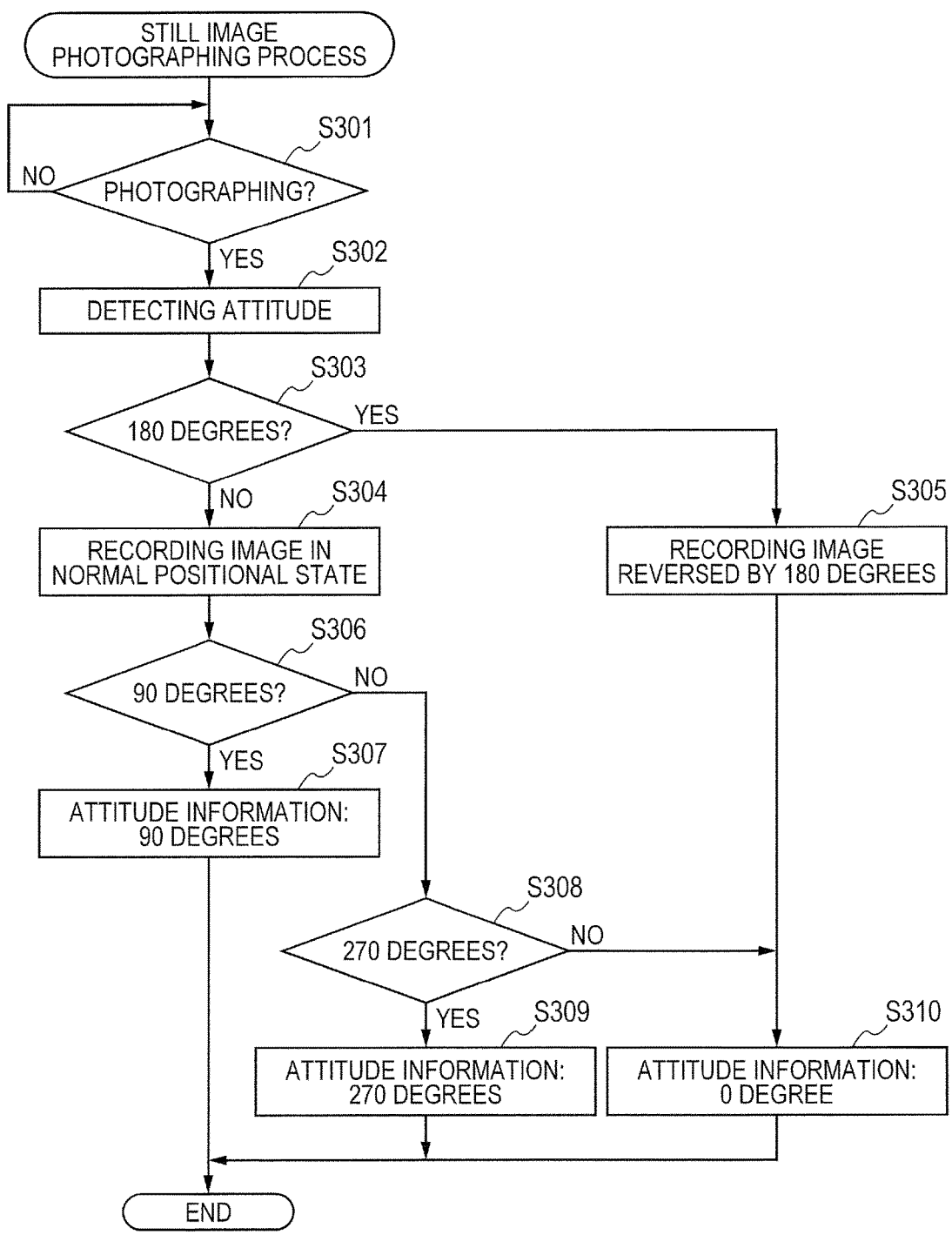
FIG. 3 is a flowchart for describing the image generating operation to a direction of the image pickup apparatus in a still image photographing according to the embodiment of the invention.

Subsequently, a flow for a process in the still image photographing mode will be described as an example of the exemplary embodiments of the image pickup apparatus in the present embodiment with reference to a flowchart of FIG. 3. The process is realized by a method whereby the program recorded in the nonvolatile memory 56 is developed into the system memory 52 and the system control unit 50 executes the program.

In S301, the digital camera 100 discriminates whether or not the still image photographing operation is provided (that is whether or not the signal SW2 is ON). If it is determined that the still image photographing operation is not the processing routine is returned to S301 and a similar process is repeated. If it is determined that the still image photographing operation is provided, the processing routine advances to S302.

In S302, an image pickup sensor of the digital camera 100 detects the orientation of the camera with reference to the vertical direction and the system control unit 50 holds the detected orientation as attitude information. In S302, first, the current attitude information is obtained from the attitude detection unit 55. An attitude discriminating process discriminating whether or not the obtained attitude is closest to which one of the following four attitudes is executed. A discrimination result is held in the system memory 52 as attitude information showing any of 0 degree, 90 degrees, 180 degrees, and 270 degrees.
(1) State where the camera is held in a normal positional state (0 degree).
(2) State where the camera is held at a vertical position at which it is rotated by 90 degrees (90 degrees).
(3) State where the camera is held upside down (180 degrees).
(4) State where the camera is held at a vertical position at which it is rotated by 270 degrees (that is, upside down vertical position of (2)) (270 degrees).

Although the timing for obtaining the attitude information from the attitude detection unit 55 is set to the timing just after the photographing, information just before the photographing may be obtained. For example, it is also possible to construct in such a manner that at the time of ON of SW1 (half-depression state of the shatter button 61) just before SW2 is turned on (full depression state of the shutter button 61) at the time when the photographing is performed, the attitude information detected by the attitude detection unit 55 is held in the system memory 52 and the attitude is discriminated on the basis of the held attitude information.

In a self-timer photographing, when there is an instruction to start a self-timer, the attitude information detected by the attitude detection unit 55 is held in the system memory 52. When there is a start instruction of the self-timer, the attitude may be discriminated on the basis of the held attitude information irrespective of the attitude during the countdown of the self-timer.

In S303, the system control unit 50 discriminates whether or not the attitude information indicates 180 degrees. If the attitude information indicates 180 degrees, S305 follows. If NO, S304 follows. In S305, the system control unit 50 rotates the image which is photographed and held in the memory 32 by 180 degrees, generates an image file on the basis of the image rotated by 180 degrees and records into the recording medium 200. In S310, the attitude information is set to 0 degree and added to the foregoing image file. The processing routine is finished.

In S304, the system control unit 50 records the photographed image as an image file into the recording medium 200 in a normal positional state (that is, without being rotated).

In S306, the system control unit 50 discriminates whether or not the attitude information held in the system memory 52 indicates 90 degrees. If the attitude information indicates 90 degrees, S307 follows. If NO, S308 follows.

In S307, the system control unit 50 adds 90 degrees as attitude information to the image file in which the image is recorded in S304 and finishes the processing routine.

In S308, the system control unit 50 discriminates whether or not the attitude information held in the system memory 52 indicates 270 degrees. If it is determined that the attitude information indicates 270 degrees, S309 follows. If NO, that is, if the attitude information indicates 0 degree, S310 follows.

In S309, the system control unit 50 adds 270 degrees as attitude information to the image file in which the image is recorded in S304 and finishes the processing routine.

In S310, the system control unit 50 adds 0 degree as attitude information to the image file in which the image is recorded in S304 and finishes the processing routine.

In this manner, in the still image photographing process in the present embodiment, the image photographed by holding the camera at each attitude is processed as follows.

(1) In case of the image photographed in a state where the camera is held at a normal position (0 degree), the image is recorded without being rotated, and the attitude flag showing 0 degree is recorded as attribution information in association with the image.

(2) in case of the image photographed in a state where the camera is rotated by 90 degrees and held vertically (90 degrees), the image is recorded without being rotated, and the attitude flag showing 90 degrees is recorded as attribution information in association with the image.

(3) In case of the image photographed in a state where the camera is held upside down (180 degrees), the image is rotated by 180 degrees and recorded, and the attitude flag showing 0 degree is recorded as attribution information in association with the image.

(4) In case of the image photographed in a state where the camera is rotated by 270 degrees and held vertically (that is, upside-down vertical position of (2)), the image is recorded without being rotated, and the attitude flag showing 270 degrees is recorded as attribution information in association with the image.

With respect to the image photographed in a state where the camera is rotated by 270 degrees and held vertically, the image may be rotated by 180 degrees and the attitude flag may be set to 90 degrees and recorded. By constructing as mentioned above, in the display to which the attitude flag is reflected, the image can be displayed in a state in which the top and bottom of the displayed image are in a normal positional state without rotating the display apparatus. In spite of it, even in the display to which the attitude flag is not reflected, it is sufficient that a range where the display apparatus is rotated so that the user can correctly view the top and bottom of the displayed image is set to up to 90 degrees.

That is, even in the case of sequentially displaying the images among the images in which the images of (2) and (4) mentioned above exist mixedly, a motion amount required to change the holding state of the display apparatus by the user can be reduced.

Only the image photographed by holding the camera upside down as mentioned in (3) may be rotated by 180 degrees and recorded without adding the attitude flag.

Subsequently, a flow for a process in the moving image photographing mode will be described as an example of the exemplary embodiments of the image pickup apparatus in the embodiment with reference to a flowchart of FIG. 4. The process is realized by a method whereby the program stored in the nonvolatile memory 56 is developed into the system memory 52 and the system control unit 50 executes the program.

In S401, the system control unit 50 discriminates whether or not the moving image recording start operation is provided. If it is determined that the moving image recording start operation is not provided, the processing routine is returned to S401 and a similar process is repeated. If it is determined that the moving image recording start operation is provided, the processing routine advances to S402.

In S402, the image pickup sensor of the digital camera 100 detects the orientation of the camera with reference to the vertical direction at the time of the recording start and the system control unit 50 holds the detected orientation as attitude information. In S402, first, the current attitude information is obtained from the attitude detection unit 55. Whether or not the attitude is closest to which one of the following two attitudes is discriminated. A discrimination result is held in the system memory 52 as attitude information showing either 0 degree or 180 degrees.
(1) State where the camera is held in a normal positional state (0 degree).
(2) State where the camera is held, upside down (180 degrees).

In S403, the system control unit 50 discriminates whether or not the attitude information indicates 180 degrees. If the attitude information indicates 180 degrees, S405 follows. If the attitude information indicates 0 degree, S404 follows.

In S405, the system control unit 50 starts the moving image recording in a state where the data read out by the image pickup sensor is rotated by 180 degrees. Until the recording of the moving image is finished, all of the images are rotated by 180 degrees and recorded.

In S404, the system control unit 50 starts the moving image recording in a state where the data read out by the image pickup sensor is in a conventionally normal positional state (that is, without being rotated). Until the recording of the moving image is finished, all of the images are recorded without being rotated. After S404 or S405, the processing routine advances to S406.

In S406, the system control unit 50 discriminates whether or not the operation to finish the moving image recording is instructed. Until the moving image recording finishing operation is instructed, the moving image recording is continued in S407, and the discrimination in S406 is repeated. If it is determined in S406 that the moving image recording finishing operation is instructed, the moving image recording is stopped.

According to the embodiment of the invention described above, the still image and moving image photographed by holding the camera upside down can be recorded so as to be displayed in such a manner that the to and bottom of the displayed image are certainly held in the normal orientation with respect to the normal position of the display apparatus irrespective of the function which the display apparatus has.

Although the case where the invention is applied to the image pickup apparatus is described as an example in the foregoing embodiment, the invention is not limited to such an example but can be also applied to any apparatus having the image pickup unit. That is, the invention can be applied to a portable phone terminal, a portable image viewer, or the like.

Other Embodiments

The invention is also realized by executing the following processes. That is, software (program) for realizing the functions of the embodiment mentioned above is supplied to a system or apparatus through a network or various kinds of storage media, a computer (or a CPU, MPU, or the like) of the system or apparatus reads out a program code of the program, and executes. In this case, the program and a computer-readable storage medium in which the program is stored construct the invention.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2012-279599 filed on Dec. 21, 2012, which is hereby incorporated by reference herein in its entirety.

What is claimed is:

1. An image pickup apparatus having an image sensor which picks up an object image and obtains a picked-up image, comprising:
   a memory and at least one processor which function as:
   an attitude detection unit configured to detect an attitude of the image pickup apparatus wherein the attitude detection unit is capable of detecting at least a normal attitude, vertical attitude vertical to the normal attitude, and an upside down attitude; and
   a control unit configured to control on the basis of the attitude detected by the attitude detection unit when the picking up by the image sensor is performed, in such a manner that
   in a case where the attitude detection unit detects that an attitude of the image pickup apparatus in image pickup corresponds to the normal attitude, picked-up image is recorded to a recording, medium without being rotated, and a first attitude information corresponding to the normal attitude is added thereto as attribute information,
   in a case where the attitude detection unit detects that an attitude of the image pickup apparatus in image pickup corresponds to the vertical attitude, picked-up image is recorded to the recording medium without being rotated, and a second attitude information corresponding to the vertical attitude is added thereto as attribute information, and
   in a case where the attitude detection unit detects that an attitude of the image pickup apparatus in image pickup corresponds to the upside down attitude, picked-up image is recorded to the recording medium with being rotated upside down, and the first attitude information is added thereto as attribute information.

2. An apparatus according to claim 1, therein the control unit controls in such a manner that in the image picked-up by the image sensor, if it is determined that an attitude of the image pickup apparatus in image pickup corresponds to the normal attitude, the image is recorded without being rotated and the first attitude information corresponds to 0 degree is added,
   if it is determined that an attitude of the image pickup apparatus in image pickup corresponds to the vertical attitude rotated by 90 degrees from the normal attitude, the image is recorded without being rotated and the second attitude information corresponds to 90 degrees is added, if it is determined that an attitude of the image pickup apparatus in image pickup corresponds to the upside down attitude, the image is rotated by 180 degrees and recorded and the first attitude information is added, and, if it is determined that an attitude of the image pickup apparatus in image pickup corresponds to a vertical attitude rotated by 270 degrees from the normal attitude, the image is recorded without being rotated and a third attitude information corresponds to 270 degrees is added, and wherein the added attitude information is recorded as the attribution information in association with the image.

3. An apparatus according to claim 1, wherein the control unit controls in such a manner that with respect to the image picked-up by rotating the image pickup apparatus by 270 degrees to hold vertically, the picked-up image is rotated by 180 degrees and the second attitude information corresponding to 90 degrees is added thereto, and the image is recorded in the recording medium.

4. An apparatus according to claim 1, wherein after a shutter button is fully depressed, the attitude detection unit executes an attitude discriminating process of the state in which the image pickup apparatus is held.

5. An apparatus according to claim 1, wherein in a state in which a shutter button is in a half-depression on state, the attitude detection unit executes an attitude discriminating process of the state in which the image pickup apparatus is held.

6. An apparatus according to claim 1, wherein in a self-timer photographing, when there is an instruction to start a self-timer the attitude detection unit executes an attitude discriminating process of the state in which the image pickup apparatus is held.

7. An apparatus according to claim 1, wherein in a case where a moving image recording start operation is provided, at a point of time of the recording start of the moving image, the attitude detection unit executes an attitude discriminating process of the state in which the image pickup apparatus is held.

8. An apparatus according to claim 1, wherein a display apparatus which is arranged to display a through image which is output from the image sensor is arranged on an apparatus main body with a close and open mechanism.

9. A control method of an image pickup apparatus having an image sensor which picks up an object image and obtains a picked-up image, comprising:

an attitude detection step of detecting an attitude of the image pickup apparatus, wherein the attitude detection step is capable of detecting at least a normal attitude, a vertical attitude vertical to the normal attitude, and an upside down attitude; and a control step of controlling on the basis of the attitude detected in the attitude detection step when the picking up by the image sensor is performed, in such a manner that in a case where an attitude of the image pickup apparatus in image pickup detected in the attitude detection step corresponds to the normal attitude, picked-up image is recorded to a recording medium without being rotated, and a first attitude information corresponding to the normal attitude is added thereto as attribute information, in a case where an attitude of the image pickup apparatus in image pickup detected in the attitude detection step corresponds to the vertical attitude, picked-up image is recorded to a recording medium without being rotated, and a second attitude information corresponding to the vertical attitude is added thereto attribute information, and in a case where an attitude of the image pickup apparatus in image pickup detected in the attitude detection step corresponds to the upside down attitude, picked-up image is recorded to the recording medium with being rotated upside down, and the first attitude information is added thereto as attribute information.

10. A non-transitory computer-readable storage mediums storing a program for causing a computer to execute a control method of an image pickup apparatus having image sensor which pick up an object image and obtains a picked-up image, wherein the computer includes a memory and at least one processor, wherein the control method comprises:

an attitude detection, step of detecting an attitude of the image pickup apparatus, wherein the attitude detection step is capable of detecting at least a normal attitude, a vertical attitude vertical to the normal attitude, and upside down attitude; and a control step of controlling on the basis f the attitude detected in the attitude detection step the picking up by the image sensor is performed, in such a manner that in a case where an attitude of the image pickup apparatus in image pickup detected in the attitude detection step corresponds to the normal attitude, picked-up image is recorded to a recording medium without being rotated, and a first attitude information corresponding to the normal attitude is added thereto as attribute information, in a case where an attitude of the image pickup apparatus in image pickup detected in the attitude detection step corresponds to the vertical attitude, picked-up image is recorded to a recording medium without being rotated, and a second attitude information corresponding to the vertical attitude is added thereto as attribute information, and in a case where an attitude of the image pickup apparatus in image pickup detected in the attitude detection step corresponds to the upside down attitude, picked-up image is recorded to the recording medium with being rotated upside down, and the first attitude information is added thereto as attribute information.

11. An image pickup apparatus comprising:

an image sensor; and a memory and at least one processor which function as:

an attitude detection unit configured to detect an attitude of the image pickup apparatus, wherein the attitude detection unit is capable of detecting at least a first attitude, a second attitude rotated by 90 degrees from the first attitude, and a third attitude rotated by 180 degrees from the first attitude; and a control unit configured to control, on the basis of the attitude detected by the attitude detection unit when picking up by the image sensor is performed, in such a manner that in a case where the attitude detection unit detects that an attitude of the image pickup apparatus in image pickup corresponds to the first attitude, picked-up image is recorded to a recording medium in a state in which a direction of the picked-up image is a predetermined direction, and a first attitude information corresponding to the first attitude is added thereto as attribute information, in a case where the attitude detection unit detects that an attitude of the image pickup apparatus in image pickup corresponds to the second attitude, picked-up image is recorded to the recording medium in a state in which the direction of the picked-up image is the predetermined direction, and second attitude information corresponding to the second attitude is added thereto as attribute information, and in a case where the attitude detection unit detects that an attitude of the image pickup apparatus in image pickup corresponds to the third attitude, picked-up image is recorded to the recording medium in a state in which the direction of the picked-up image is different by 180 degrees from the predetermined direction, and the first attitude information is added thereto as attribute information.

12. The image pickup apparatus according to claim 11, wherein the control unit controls such a manner that, in a case where the attitude detection unit detects that an attitude of the image pickup apparatus in image pickup corresponds to a fourth attitude rotated by 270 degrees from e first attitude, picked-up image is recorded to the recording medium in a state in which the direction of the picked-up image is the predetermined direction, and a third attitude information corresponding to 270 degrees is added thereto as the attribute information.

13. The image pickup apparatus according to claim 11, wherein the control unit controls in such a manner that in a case that the image pickup apparatus is held in a fourth attitude rotated by 270 degrees from the first attitude when picking up the image, picked-up image is recorded to the recording medium in a state in which the direction of the picked-up image is rotated by 180 degrees from the predetermined direction, and the second attitude information is added thereto as attribute information.

14. The image pickup apparatus according to claim 11, wherein after a shutter button is fully depressed, the attitude detection unit executes an attitude discriminating process of the state in which the image pickup apparatus is held.

15. The image pickup apparatus according to claim 11, wherein in a state in which a shutter button is in a half-depression state, the attitude detection unit executes an attitude discriminating process of the state in which the image pickup apparatus is held.

16. The image pickup apparatus according to claim 11, wherein in a self-timer photographing, when there is an instruction to start a self-timer, the attitude detection unit executes an attitude discriminating process of the state in which the image pickup apparatus is held.

17. The image pickup apparatus according to claim 11, wherein in a case where a moving image recording start operation is provided, at a point of time of the recording start of the moving image, the attitude detection unit executes an attitude discriminating process of the state in which the image pickup apparatus is held.

18. The image pickup apparatus according to claim 11, wherein a display apparatus which is arranged to display a through image which is output from the image sensor is arranged on an apparatus main body with a close and open mechanism.

19. The image pickup apparatus according to claim 11, wherein the control unit controls in such a manner that in a case that the picked-up image is recorded to the recording medium in a state in which the direction of the picked-up image is the predetermined direction, the picked-up image is recorded to the cording medium without being rotated, in a case that the picked-up image is recorded to the recording medium in a state in which the a direction of the picked-up image is different from the predetermined direction, the picked-up image is recorded to the recording medium in the state in which the direction of the picked-up image is different from the predetermined direction by being rotated.

20. An image pickup apparatus according to claim 11, wherein the second attitude is an attitude in a case where the image pickup apparatus is held vertically, and the third attitude is an attitude in a case where the image pickup apparatus is held upside down.

21. The image pickup apparatus according to claim 11, wherein a display apparatus in communication with the control unit is configured to display the image such that:

when attitude information added as attribute information in association with a recorded image is read out, the recorded image is selectively rotated based on the attribute information and displayed; and when attitude information is not recorded as attribute information in association with the recorded image, the recorded image is displayed without being rotated.

22. The pickup apparatus according to claim 11, wherein the attitude information is readable information when the picked-up image is reproduced and displayed by a display apparatus.

23. The age pickup apparatus according to claim 11, wherein the attitude information is information to be referred for automatically rotating and displaying the picked-up image by a display apparatus when the picked-up image is reproduced and displayed by the display apparatus.

24. The image pickup apparatus according to claim 11, wherein in a case where the recorded image to which the second attitude information is added is reproduced to be displayed by a display apparatus, an object in the recorded image is displayed in a first direction when an automatic rotation referring to the attitude information is performed to the recorded image, and the object in the recorded image is displayed in a second direction different from the first direction by 90 degrees when the automatic rotation referring to the attitude information is not performed to the recorded image, and in a case where the recorded image picked up by holding the image pickup apparatus in the third attitude information is reproduced to be displayed by the display apparatus, the object in the recorded image is displayed in the first direction whether displaying referring to the attitude information is performed or not.

25. The image pickup apparatus according to claim 11, further comprising a display apparatus that is capable of displaying the picked-up image, wherein a positional relationship between the display apparatus and an image pickup apparatus main body is changeable.

26. The image pickup apparatus according to claim 11, wherein the control unit is configured to control, on the basis of the attitude detected by the attitude detection unit to perform recording a picked-up moving image to a recording medium either in a predetermined direction or, in a direction different from the predetermined direction by 180 degrees.

27. A control method of an image pickup apparatus comprising:

detecting an attitude of the image pickup apparatus by
detecting at least a first attitude, a second attitude
rotated by 90 degrees from the first attitude, and a third
attitude rotated by 180 degrees from the first attitude;
and
controlling, on the basis of the attitude detected by the
detecting the attitude when picking up by an image
sensor is performed, in such a manner that
in a case where an attitude of the image pickup apparatus
in image pickup detected by the attitude detection
corresponds to the first attitude, picked-up image is
recorded to a recording medium in a state in which a
direction of the picked-up image is a predetermined
direction, and a first attitude information corresponding
to the first attitude is added thereto as attribute information,
in a case where an attitude of the image pickup apparatus
in image pickup detected by the attitude detection
corresponds to the second attitude, pick-up image is
recorded to the recording medium in a state in which
the direction of the picked-up image is the predetermined direction, and a second attitude information
corresponding to the second attitude is added thereto as
attribute information, and
in a case where an attitude of the image pick up apparatus
in image pickup detected by the attitude detection
corresponds to the third attitude, picked-up image is
recorded to the recording medium in a state in which
the direction of the picked-up image is different by 180
degrees from the predetermined direction, and the first
attitude information is added thereto as attribute information.

28. A non-transitory computer-readable storage medium storing a program for causing a computer to execute a control method of an image pickup apparatus having an image sensor which picks up an object image and obtains a picked-up image, wherein the computer includes a memory and at least one processor, the control method comprising:
detecting an attitude of the image pickup apparatus by
detecting at least a first attitude, a second attitude
rotated by 90 degrees from the first attitude, and a third
attitude rotated by 180 degrees from the first attitude;
and
controlling, on the basis of the attitude detected by the
detecting the attitude when picking up by the image
sensor is performed, in such a manner that
in a case where an attitude of the image pickup apparatus
in image pickup detected by the attitude detection
corresponds to the e first attitude, picked-up image is
recorded to a recording medium in a state in which a
direction of the picked-up image is a predetermined
direction, and a first attitude information corresponding
to the first attitude is added thereto as attribute information,
in a case where an attitude of the image pickup apparatus
in image pickup detected by the attitude detection
corresponds to the second attitude, picked-up image is
recorded to the recording medium in a state in which
the direction of the picked-up image is the predetermined direction, and a second attitude information
corresponding to the second attitude is added thereto as
attribute information, and
in a case where an attitude of the image pick up apparatus
in image pickup detected by the attitude detection
corresponds to the third attitude, the picked-up image is
recorded to the recording medium in a state in which
the direction of the picked-up image is different by 180
degrees from the predetermined direction, and the first
attitude information is added thereto as attribute information.

29. An image pickup apparatus comprising:
an image sensor; and
a memory and at least one processor which function as:
an attitude detection unit configured to detect an attitude
of the image pickup apparatus, wherein the attitude
detection unit is capable of detecting at least a first
attitude, a second attitude rotated by 90 degrees from
the first attitude, and a third attitude rotated by 180
degrees from the first attitude; and
a control unit configured to control, on the basis of the
attitude detected by the attitude detection unit when
picking up by the image sensor is performed, in such a
manner that
in a case where the attitude detection unit detects that an
attitude of the image pickup apparatus in image pickup
corresponds to the first attitude, picked-up image is
recorded to a recording medium in a state in which a
direction of the picked-up image is a predetermined
direction,
in a case where the attitude detection unit detects that an
attitude of the image pickup apparatus in image pickup
corresponds to the second attitude, picked-up image is
recorded to the recording medium in a state in which
the direction of the picked-up image is the predetermined direction, and a second attitude information
corresponding to the second attitude is added thereto as
attribute information, and
in a case where the attitude detection unit detects that an
attitude of the image pick up apparatus in image pickup
corresponds to the third attitude, picked-up image is
recorded to the recording medium in a state in which
the direction of the picked-up image is different by 180
degrees from the predetermined direction,
wherein in a case where recorded image to which the
second attitude information is added is reproduced to
be displayed by a display apparatus, an object in the
recorded image is displayed in a first direction when an
automatic rotation referring to the attitude information
is performed to the recorded image, and the object in
the recorded image is displayed in a second direction
different from the first direction by 90 degrees when the
automatic rotation referring to the attitude information
is not performed to the recorded image, and
in a case where the recorded image picked up by holding
the image pickup apparatus in the third attitude is
reproduced to be displayed by the display apparatus,
the object the recorded image is displayed in the first
direction whether displaying referring to the attitude
information is performed or not.

30. A control method of an image pickup apparatus comprising:
detecting an attitude of the image pickup apparatus by
detecting at least a first attitude, a second attitude
rotated by 90 degrees from the first attitude, and a third
attitude rotated by 180 degrees from the first attitude;
and
controlling, on the basis of the attitude detected by the
detecting the attitude when picking up by an image
sensor is performed, in such a manner that
in a case where an attitude of the image pickup apparatus
in image pickup detected by the attitude detection
corresponds to the first attitude, picked-up image is recorded to a recording, medium in a state in which a direction of the picked-up image is a predetermined direction,
in a case where an attitude of the image pickup apparatus in image pickup detected by the attitude detection corresponds to the second attitude, picked-up image is recorded to the recording medium in a state in which the direction of the picked-up image is the predetermined direction, and a second attitude information corresponding to the second attitude is added thereto as attribute information, and
in a case where an attitude of the image pick up apparatus in image pickup detected by the attitude detection corresponds to the third attitude, picked-up image is recorded to the recording medium in a state in which the direction of the picked-up image is different by 180 degrees from the predetermined direction,
wherein in a case where a recorded image to which the second attitude information is added is reproduced to be displayed by a display apparatus, an object in the recorded image is displayed in a first direction when an automatic rotation referring to the attitude information is performed to the recorded image, and the object in the recorded image is displayed in a second direction different from the first direction by 90 degrees when the automatic rotation referring to the attitude information is not performed to the recorded image, and
in a case where the recorded image picked up by holding the image pickup apparatus in the third attitude is reproduced to be displayed by the display apparatus, the object in the recorded image is displayed in the first direction whether displaying referring to the attitude information is performed or not.

31. A non-transitory computer-readable storage medium storing a program for causing a computer to execute a control method of an image pickup apparatus, the control method comprising:
detecting an attitude of the image pickup apparatus by detecting at least a first attitude, a second attitude rotated by 90 degrees from the first attitude, and a third attitude rotated by 180 degrees from the first attitude; and
controlling, on the basis of the attitude detected by the detecting the attitude when picking up by an image sensor is performed, in such a manner that
in a ease where an attitude of the image pickup apparatus in image pickup detected by the attitude detection corresponds to the first attitude, picked-up image is recorded to a recording medium in a state in which a direction of the picked-up image is a predetermined direction,
in a case where attitude of the image pickup apparatus in image pickup detected by the attitude detection corresponds to the second attitude, picked-up image is recorded to the recording medium in a state in which the direction of the picked-up image is the predetermined direction, and a second attitude information corresponding to the second attitude is added thereto as attribute information, and
in a case where an attitude of the image pick up apparatus in image pickup detected by the attitude detection corresponds to the third attitude, picked-up image is recorded to the recording medium in a state in which the direction of the picked-up image is different by 180 degrees from the predetermined direction,
wherein in a case where a recorded image to which the second attitude information is added is reproduced to be displayed by a display apparatus, an object in the recorded image is displayed in a first direction when an automatic rotation referring to the attitude information is performed to the recorded image, and the object in the recorded image is displayed in a second direction different from the first direction by 90 degrees when the automatic rotation referring to the attitude information is not performed to the recorded image, and
in a case where the recorded image picked up by holding the image pickup apparatus in the third attitude is reproduced to be displayed by the display apparatus, the object in the recorded image is displayed in the first direction whether displaying referring to the attitude information is performed or not.

* * * * *